UNITED STATES PATENT OFFICE.

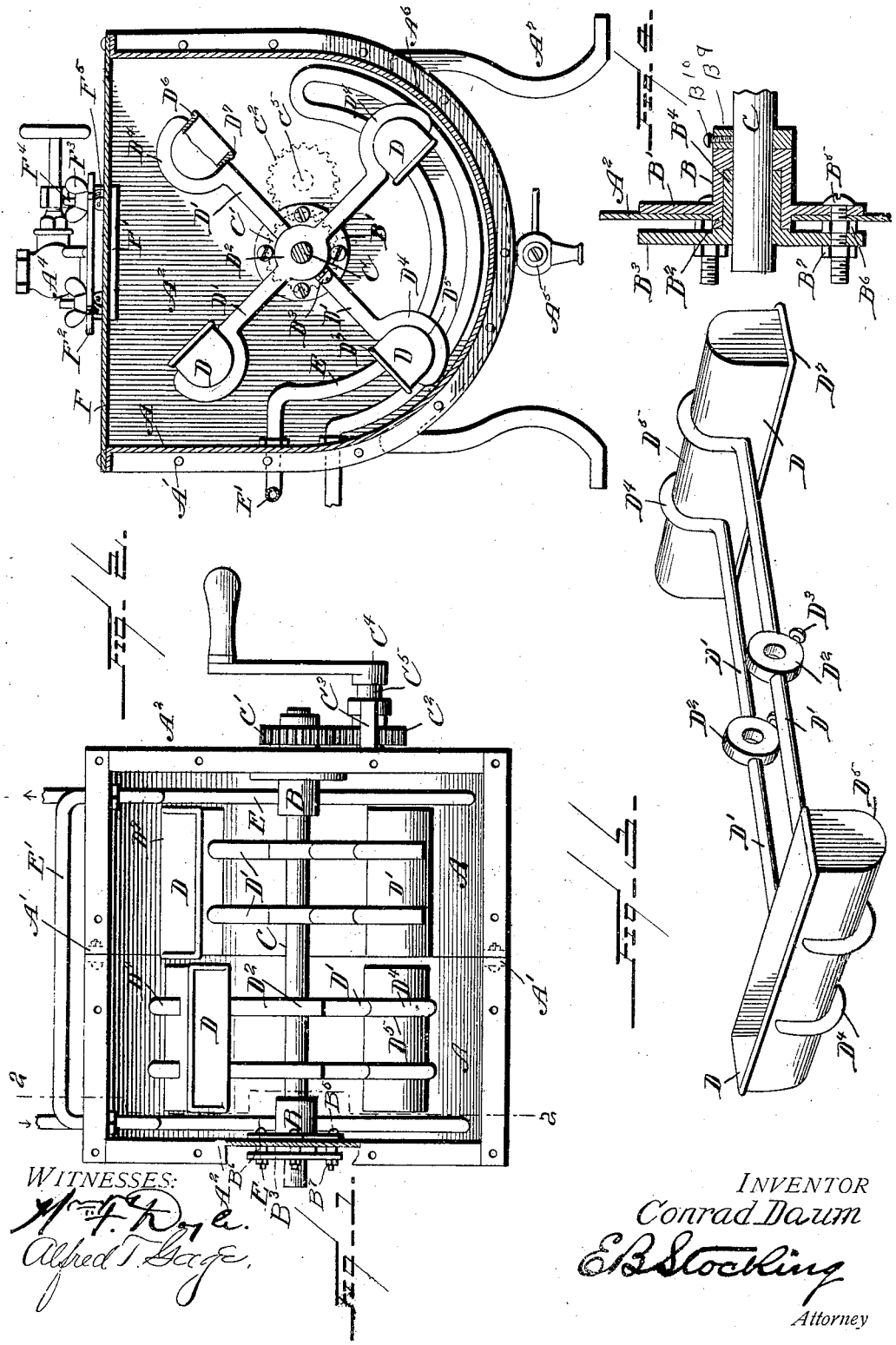

CONRAD DAUM, OF SCRANTON, PENNSYLVANIA.

YEAST-MIXER.

No. 836,565.  Specification of Letters Patent.  Patented Nov. 20, 1906.

Application filed April 13, 1905. Serial No. 255,416.

*To all whom it may concern:*

Be it known that I, CONRAD DAUM, a citizen of the United States, residing at Scranton, in the county of Lackawanna, State of Pennsylvania, have invented certain new and useful Improvements in Yeast-Mixers, of which the following is a specification, reference being had therein to the accompanying drawings.

This invention relates to a yeast-mixer, and particularly to a construction embodying movable buckets for thoroughly mixing and incorporating the yeast with the wort preparatory to its use in a brewing or fermenting operation.

The invention has for an object to provide an improved construction and arrangement of a tank or casing containing buckets carried by rotatable arms disposed at an angle to each other and in different vertical planes extending across the tank.

Other and further objects and advantages of the invention will be hereinafter set forth and the novel features thereof defined by the appended claims.

In the drawings, Figure 1 is a plan with the cover removed; Fig. 2, a cross-section on the line 2 2 of Fig. 1; Fig. 3, a detail perspective of one pair of buckets and their supporting-arms, and Fig. 4 a detail vertical section of the stuffing-box for the driving-shaft.

Like letters of reference refer to like parts in the several figures of the drawings.

The letter A designates the casing or tank, which may be of any desired construction or material, and preferably one formed of metal and composed of two parts bolted together by flanges at the middle of the tank, as shown by dotted lines at A' in Fig. 1. Each of the end walls $A^2$ of the tank is provided with suitable bearing or stuffing boxes of any desired construction, but preferably formed as shown in Fig. 4, wherein a bearing B is disposed within the tank and has a bolting-plate B' bearing against the inner face of the end wall $A^2$, while the bearing B is also provided with a portion $B^2$, extending through said wall. Upon the outer face of the end wall a plate $B^3$ is located and provided with a sleeve $B^4$, closely fitting the driving-shaft C and extended within the bearing B. These parts are secured together by any preferred arrangement of bolts—for instance, the bolt $B^5$, as shown, which is provided with a spacing-nut $B^6$ thereon between the plate $B^3$ and the end of the tank and with a lock-nut $B^7$, bearing upon the outer face of said plate. This construction and arrangement of stuffing-box provides an extended bearing for the shaft, which cannot be obtained upon the thin metal of the end wall of the tank, and also prevents the entrance of air to contaminate or affect the contents of the tank, while the securing parts are so disposed as not to catch and hold material used within the tank.

If desired, in order to further insure non-leakage at the bearing a tightly-fitting collar $B^9$ is mounted upon the shaft C and abuts snugly against the inner end of the bearing B. A set-screw $B^{10}$ serves to secure the collar in position upon the shaft.

The driving-shaft C is provided at one of its ends beyond the end walls $A^2$ of the tank with a gear C', meshing with a gear $C^2$, carried by a bracket or keeper $C^3$ and provided with an operating-handle $C^4$ upon its shaft $C^5$. This handle may be used when the machine is driven by hand, and if other driving mechanism be used a suitable connection therefor will be applied to this shaft $C^5$. For the purpose of agitating the yeast or other material within the tank the buckets D are mounted upon arms D', extending in opposite directions from a hub $D^2$, adapted to be disposed upon the shaft C and secured thereon by the set-screw $D^3$. The opposite ends of these arms are formed into curved sockets $D^4$, disposed in opposite directions to each other, and within these sockets the curved bottoms $D^5$ of the buckets are adapted to rest and be secured by soldering or otherwise. These arms are secured upon the driving-shaft substantially at a right angle to each other, so that the buckets in their passage through the material within the tank operate alternately, first at one side and then at the other, as the buckets only extend for a portion of the width of the tank and are not disposed in alinement with each other. The buckets are also strengthened and finished upon their exposed edges by means of a rod or wire $D^6$, extending around the same, over which the edge of the bucket is turned, as at $D^7$, and securely soldered, thus leaving no space to catch and hold matter which could ferment or decompose and rendering the parts easily cleansed.

Under many conditions of use it is necessary to maintain the yeast at a predetermined temperature and to prevent a too great rise in its temperature during the mixing operation. For this purpose a cooling-pipe E is disposed at the opposite sides of the tank beyond the path of travel of the buckets and forms a return-coil having a connecting-pipe E' at one side of the tank, so that continuous circulation of brine or other cooling medium may be maintained. The pipes E are curved in the arc of travel of the buckets and disposed adjacent thereto, so that the circulation established by the buckets removes sediment and adhering matter from the pipes and keeps them clean at all times. It is also important that the tank be sealed against the entrance of air during the mixing operation, and for that reason a plate F is secured to the top of the tank and provided at its center with a suitable manhole F', having a cover-plate F², held in position by any preferred means—for instance, the wing-nuts F³, carried by the bolts F⁴, which are pivotally mounted at their lower ends F⁵, so as to swing away from the slotted edges of the plate F² and permit the free removal thereof. This plate F' is also provided with an inlet-valve A⁴, communicating with a source of air-supply, preferably an air-filter, by which the necessary air may be introduced for the purpose of removing the contents of the tank after they are thoroughly mixed. This removal is effected through a draw-off cock A⁵ at the bottom of the tank, which may also be used for draining purposes or otherwise in the cleaning of the tank. The tank is preferably supported upon a yoke A⁶, as shown by dotted lines in Fig. 2, having depending legs A⁷ at its opposite ends.

This invention in its operation is especially adapted to produce the most desirable results in the mixture of yeast with the beer-wort preparatory to its further use in the brewing operation, and it is essential that there should be a thorough mixture in order to secure the development of each of the yeast-cells in a proper body of liquid, so that when added to another body to be fermented the action of the yeast will be uniform in time, strength, and character. A desirable manner of securing this result has heretofore been by mixing the yeast by hand and consisted in raising a proper quantity of the yeast and wort to the height of a man's head and then pouring into another receptacle at his feet, thus passing the fluid body through an intervening air-space and by reason of the fall breaking up assembled cells so as to secure an independent development thereof. This operation required usually more than an hour's time and very arduous labor, while the ultimate result was not satisfactory, as the degree of fall varied during the operation and the mixture was exposed to the contamination of the atmosphere and varying temperature thereof. The construction of the present device obviates all of these difficulties by providing for a regular fall, as the liquid within the receptacle does not rise above the line of the driving-shaft and is carried upward by the buckets so as to be discharged upon the upper surface of the liquid remaining in the tank, this action being conducted within an air-tight chamber maintained at a proper temperature, so that the necessary thorough mixing and development of the yeast-cells can be secured in from fifteen to twenty minutes by continuous operation of the machine. Attention is also called to the arrangement of these buckets upon their arms, so that at no time is more than one bucket discharging, and that each bucket extends for only a portion of the length of the shaft. This is to effect a more extended discharge of the contents of the bucket upon the surface of the liquid below and a circulation in alternately opposite directions by removing different portions of the surface thereof, which cannot be effectually obtained when the bucket extends substantially the entire length of the driving-shaft. The arrangement of arms having the sockets disposed in opposite directions at their free ends in connection with the buckets to fit these arms provides a construction in which the minimum resistance in operation is offered and no spaces are left to catch and hold fermentable or decomposing matter, thus rendering the cleansing of the machine both easy and convenient, as access is obtained through the manhole in the top thereof.

When the contents of the machine are to be discharged, filtered air under pressure is introduced through the valve upon the cover-plate and forces the contents of the tank out through the draw-off cock in the bottom and thence through suitable connections to the desired tank or vat where it is to be used in the brewing operation.

The construction and arrangement of the packing-box also provides for a practically air-tight connection at that point and one in which the protuberances upon the interior of the tank are avoided.

While the invention has been described for use as a yeast-mixer, for which it is particularly adapted, still the construction and arrangement may be conveniently used for mixing other materials.

Having described my invention and set forth its merits, what I claim, and desire to secure by Letters Patent, is—

1. In a yeast-mixer, a tank, a shaft extending therethrough, radial arms extending from said shaft at different points longitudinally and at an angle to each other, each arm having oppositely-disposed buckets at its opposite ends.

2. In a yeast-mixer, a tank provided with a driving-shaft therein, arms upon said shaft provided with buckets, and a curved temperature-regulating pipe disposed at one end of said shaft in the arc of travel of said buckets and adjacent thereto below the horizontal plane of the shaft.

3. In a yeast-mixer, a tank, a driving-shaft extending therethrough, a plurality of arms secured to said shaft at different points longitudinally thereof and extended in opposite directions at an angle to each other, a plurality of oppositely-disposed buckets carried by the free ends of said arms to travel in parallel vertical planes, a cover-plate for said tank, a valved air connection with said cover-plate, and a draw-off connection at the bottom of said tank.

In testimony whereof I affix my signature in presence of two witnesses.

CONRAD DAUM.

Witnesses:
WILLIAM W. GEIGER,
AUGUST KELLER.